US008266428B2

(12) United States Patent
Kwon et al.

(10) Patent No.: US 8,266,428 B2
(45) Date of Patent: Sep. 11, 2012

(54) SECURE COMMUNICATION SYSTEM AND METHOD OF IPV4/IPV6 INTEGRATED NETWORK SYSTEM

(75) Inventors: Taek-Jung Kwon, Seoul (KR); Kang-Young Moon, Yongin-si (KR); Sou-Hwan Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 904 days.

(21) Appl. No.: 11/640,924

(22) Filed: Dec. 19, 2006

(65) Prior Publication Data
US 2007/0162746 A1 Jul. 12, 2007

(30) Foreign Application Priority Data

Jan. 12, 2006 (KR) .................. 10-2006-0003649

(51) Int. Cl.
*G06F 21/06* (2006.01)
(52) U.S. Cl. .................. 713/164; 713/153; 713/171
(58) Field of Classification Search .................. 713/171, 713/164, 153
See application file for complete search history.

(56) References Cited

U.S. PATENT DOCUMENTS

| | | | |
|---|---|---|---|
| 6,795,917 B1 * | 9/2004 | Ylonen | 713/160 |
| 7,353,541 B1 * | 4/2008 | Ishibashi et al. | 726/26 |
| 7,624,263 B1 * | 11/2009 | Viswanath et al. | 713/151 |
| 7,870,389 B1 * | 1/2011 | Leung et al. | 713/168 |
| 2002/0059516 A1 * | 5/2002 | Turtiainen et al. | 713/153 |
| 2003/0091013 A1 * | 5/2003 | Song et al. | 370/338 |

FOREIGN PATENT DOCUMENTS

| | | |
|---|---|---|
| JP | 2002-344443 | 11/2002 |
| JP | 2003-229884 | 8/2003 |
| JP | 2004-135134 | 4/2004 |
| JP | 2004-274521 | 9/2004 |
| JP | 2005-210645 | 8/2005 |
| KR | 2003-0092322 | 12/2003 |
| KR | 10-2004-0028329 | 4/2004 |
| KR | 10-2004-0047103 | 6/2004 |
| KR | 10-2005-0058625 | 6/2005 |
| KR | 10-2006-0070304 | 6/2006 |

OTHER PUBLICATIONS

Michael S. Borella, Methods and Protocols for Secure Key Negotiation Using IKE, Jul.-Aug. 2000, IEEE, vol. 14, 18-29.*

(Continued)

*Primary Examiner* — Jeffrey Pwu
*Assistant Examiner* — Samuel Ambaye
(74) *Attorney, Agent, or Firm* — H. C. Park & Associates, PLC

(57) ABSTRACT

An Internet Protocol version 4/Internet Protocol version 6 (IPv4/IPv6) integrated network system includes at least one first node for creating identification information capable of identifying each secret key shared with at least one second node, and for exchanging the created identification information with each second node in a secure negotiating process. Each second node creates identification information capable of identifying each secret key shared with each first node, and performs the secure negotiating process based on the secret keys corresponding to the identification information exchanged through the secure negotiating process. Thereby, secure communication complying with Security Architecture for the Internet Protocol (IPSec) can be implemented based on the secret keys in the IPv4/IPv6 integrated network system of a Network Address Translation-Protocol Translation (NAT-PT) environment.

14 Claims, 7 Drawing Sheets

OTHER PUBLICATIONS

Harkins et al., The Internet Key Exchange (IKE), Nov. 1998, Network Working Group.*
*The Decision of Grant* from the Korean Intellectual Property Office issued in Applicant's corresponding Korean Patent Application No. 10-2006-0003649 dated Dec. 11, 2007.
Korean Office action corresponding to Korean Patent Application No. 10-2006-003649, issued on Jan. 8, 2007.
Perlman, et al., *Key Exchange in IPSec: Analysis of IKE*, IEEE Internet Computing, pp. 50-56 (Dec. 2002).
Harkins, et al., *The Internet Key Exchange (IKE)*, IETF (The Internet Engineering Task Force) (Nov. 1998).
Japanese Office Action issued on Jul. 21, 2009 in the corresponding Japanese Patent Application No. 2006-344493. With English translation.
"IPsec That One Sight Will Be Enough to Tell" by Yeseup Katshito, Nikkei Network 2003.12, Nikkei BP, vol. 44, pp. 56-65, Nov. 22, 2003.
"Beginning of a Secure Seamless Roaming Method" by Takenaka Masahito, IPsec/IKE (ISEC 2004-460, IEIC Technical Report, Japan, Institute of Electronics, Information and Communication Engineers, Jul. 14, 2004, the 200 issue of vol. 104, pp. 35-40.

* cited by examiner

```
2001::1                              1234
3ffc:2c00:c:fff9::220.70.2.100       1234
```

FIG. 4

| KEY-ID | PSK(SECRET KEY) |
|---|---|
| 12345678 | 1111 |

FIRST IPV6 NODE

| KEY-ID | PSK(SECRET KEY) |
|---|---|
| 87654321 | 2222 |

SECOND IPV6 NODE

| KEY-ID | PSK(SECRET KEY) |
|---|---|
| 12341234 | 3333 |

THIRD IPV6 NODE

FIG. 5

| KEY-ID | PSK(SECRET KEY) |
|---|---|
| 12345678 | 1111 |
| 87654321 | 2222 |
| 12341234 | 3333 |
| ... | ... |

IPV4 NODE

FIG. 6 psk(pre-shared-key) = key value
KEY_ID = $[H(psk)]_{32}$
Hash Algorithm = SHA1
$[\ ]_{32}$ = LOWER 32 BIT

FIG. 9

| Next Payload Type | Value |
|---|---|
| Secure Association (SA) | 1 |
| Substructure of SA : Proposal | 2 |
| Substructure of SA : Transform | 3 |
| Key Exchange (KE) | 4 |
| Initiator Identification (IDi) | 5 |
| Certificate (CERT) | 6 |
| Certificate Request (CERTREQ) | 7 |
| Authentication (AUTH) | 9 |
| Nonce (Ni,Nr) | 10 |
| Notification (N) | 11 |
| Delete (D) | 12 |
| Vender ID (V) | 13 |
| Initiator Traffic Selector (TSi) | 14 |
| Encrypted (E) | 15 |
| Configuration (CP) | 16 |
| Extended Authentication (EXP) | 17 |
| Responder Identification (IDr) | 18 |
| Responder Traffic Selector (TSr) | 19 |
| Reserved by IANA | 20-127 |
| Reserved for private use | 128-255 |

FIG. 10

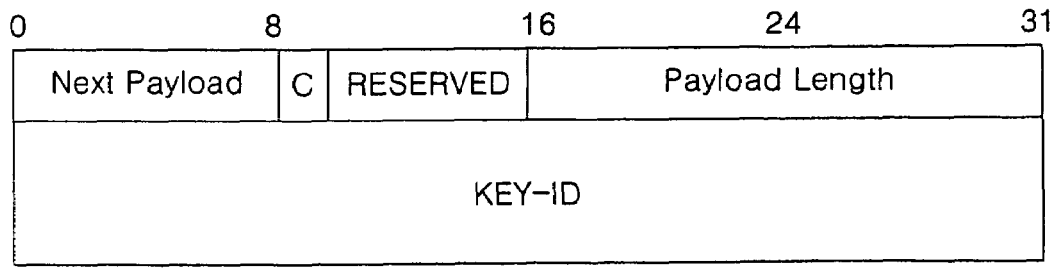

SECURE COMMUNICATION SYSTEM AND METHOD OF IPV4/IPV6 INTEGRATED NETWORK SYSTEM

CLAIM OF PRIORITY

This application makes reference to, incorporates the same herein, and claims all benefits accruing under 35 U.S.C.§119 from an application for APPARATUS AND METHOD OF SECURITY COMMUNICATION IN IPv4/IPv6 COORDINATION NETWORK SYSTEM earlier filed in the Korean Intellectual Property Office on the 12 of Jan. 2006 and there duly assigned Serial No. 10-2006-0003649.

BACKGROUND OF THE INVENTION

1. Technical Field

The present invention relates to a secure communication system and method for an Internet Protocol version 4/Internet Protocol version 6 (IPv4/IPv6) integrated network system.

2. Related Art

The Internet has taken a firm position as a core infrastructure of an information society. Due to development of a high quality of real-time service, such as Voice over Internet Protocol (VoIP) and Internet television (TV), traffic exchanged through the Internet has evolved from traffic containing text information to multimedia traffic containing voice information, image information, and video information, and its volume shows a tendency toward explosive increase.

The currently established Internet Protocol version 4 (IPv4)-based Internet employs a small piece of address information and a complicated header structure in order to accommodate rapidly increasing node and traffic. For this reason, traffic processing speeds of routers and nodes are delayed, and thus performance of the entire Internet is deteriorated.

Internet Protocol version 6 (IPv6) has been proposed to overcome this problem of the IPv4-based Internet, and has various features such as an expended address system of 128 bits, a simplified header structure, an improved quality of service (QoS), a reinforced secure system, and the like.

However, because the current Internet is widely operated based on an IPv4 network, it is impossible to replace the IPv4 network by an IPv6 network at the time. Thus, the IPv4 network will coexist with the IPv6 network for some time, and will be gradually replaced by the IPv6 network.

Accordingly, in order to successfully establish the IPv6 network, it is important for nodes and routers of the IPv6 network to coexist with those of the IPv4 network which is established at present.

In order to enable nodes connected to the IPv6 network to operate and communicate with nodes connected to the IPv4 network, an address translator for translation between an IPv6 address and an IPv4 address is required.

Currently, many translation technologies are standardized in the Internet Engineering Task Force (IETF), which is an Internet international standardization organization. Among them, two technologies, Network Address Translation-Protocol Translation (NAT-PT) and Dual Stack Transition Mechanism (DSTM), are on the rise.

In this regard, NAT-PT is a standard defined as RFC 2766 in the IETE, and specifies an IPv6-IPv4 address translation function.

An NAT-PT server is located at a boundary between the IPv6 network and the IPv4 network, and has an IPv4 address pool in which IPv4 addresses to be dynamically assigned to the IPv6 nodes are collected.

The NAT-PT server performs a network address translation (NAT) function of assigning the IPv4 address to the IPv6 node based on the IPv4 address pool when a session is initiated, and a protocol translation (PF) function.

Particularly, the NAT-PT server uses an IP header translation for translating header address information of a packet received from the IPv6 node.

There are modes for processing authentication between both opposite nodes performing IP communication. Among them, a Pre-Shared Key (PSK) mode inputs the same secret key into both nodes so as to thus process mutual authentication between both nodes.

Meanwhile, Security Architecture for the Internet Protocol (IPSec) has been developed to protect the IP, and provides a secure service such as confidentiality, data integrity, access control, data source authentication, and the like.

This IPSec should preset, maintain and manage information about a state (e.g. secure association (SA)) required by both nodes performing secure communication. The SA information may include a cipher algorithm, a key value, and the like.

Internet Key Exchange (IKE) rules have been developed, and they are adapted to flexibly and automatically set the SA between each node performing secure communication in a large-scale network. The IKE serves to perform signal authentication of both nodes performing secure communication, and to set the SA to be used for the IPSec.

However, it is impossible to perform secure communication, on the basis of the PSK mode, which is effective for mutual authentication between the IPv4 node and the IPv6 node on the IPv4/IPv6 integrated network.

In other words, in order to perform secure communication between the IPv4 node and the IPv6 node in the IPv4/IPv6 integrated network, each node sets the same identification information (e.g. the same identifier (ID)) and shared key according to the IKE rules.

At this point, the IKE rules make use of an IP address of the node as the ID in the case of an ID main mode, and an e-mail address or the like as the ID in the case of an ID aggressive mode.

However, because the NAT-PT server of the IPv4 node in the IPv4/IPv6 integrated network dynamically assigns the IPv4 addresses to the IPv6 nodes, the IPv4 node cannot know information on the IPv4 addresses assigned to the IPv6 nodes. Hence, it is impossible to perform secure communication on the basis of the PSK mode in the IPv4/IPv6 integrated network.

That is, secure communication is not supported through the ID main mode of the IKE rules in the IPv4/IPv6 integrated network, and it is impossible to perform secure communication complying with the IKE rules on the basis of the shared secret key according to the PSK mode.

SUMMARY OF THE INVENTION

It is an object of the present invention to provide a secure communication system and method for an Internet Protocol version 4/Internet Protocol version 6 (IPv4/IPv6) integrated network system, enabling secure communication complying with IPSec based on a Pre-Shared Key (PSK) mode in an integrated network in which an IPv4 network and an IPV6 network are mixed.

According to an aspect of the present invention, an IPv4/IPv6 integrated network system has at least one node included in a different network. The IPv4/IPv6 integrated network system comprises: at least one first node for creating KEY-IDs capable of identifying each secret key shared with at least one IPv4 node and exchanging the KEY-IDs with each IPv4 node in a secure negotiating process; and a second node for creating KEY-IDs capable of identifying each secret key shared with each IPv6 node and performing the secure negotiating process based on the secret keys corresponding to the exchanged KEY-IDs.

In this regard, each of the KEY-IDs preferably has a lower 32-bit value which is a result obtained by processing a value of the shared secret key by means of a hash function.

Each of the nodes preferably constructs an Internet Key Exchange (IKE) payload in which an IKE header (HDR), secure association (SA) information, and the KEY-ID are included.

Furthermore, each of the nodes preferably sets a payload value, which indicates the KEY-ID among reserved next payload values, for a Next Payload field, and transmits the KEY-ID by means of an Internet Key Exchange (IKE) payload in which the KEY-ID is set for the Next Payload field.

In addition, each of the nodes may be any one of the IPv6 node included in an IPv6 network and the IPv4 node included in an IPv4 network.

The IPv4/IPv6 integrated network system preferably further comprises a Network Address Translation-Protocol Translation (NAT-PT) server, which has an address pool capable of assigning an IPv4 address to each of the first nodes included in an IPv6 network, manages an address table based on the IPv4 addresses assigned to the first nodes, and performs mutual translation between an IPv6 packet and an IPv4 packet based on the address table.

Also, each of the nodes preferably creates an encryption key based on a value of the secret key selected in the secure negotiating process and values of key exchange and random numbers (Ni and Nr) shared in an encryption key sharing process, and when an authentication process based on the key exchange is completed, each node encrypts data based on the encryption key to perform secure communication.

According to another aspect of the present invention, an IPv4/IPv6 integrated network system preferably has at least one node included in a different network. The IPv4/IPv6 integrated network system comprises: at least one IPv4 node for creating identification information capable of identifying each secret key shared with at least one second node and exchanging the identification information with each second node in a secure negotiating process based on an Internet Key Exchange (IKE); and an IPv6 node for creating identification information capable of identifying each secret key shared with each first node, and for performing the secure negotiating process using the secret keys corresponding to the identification information exchanged through the secure negotiating process.

According to yet another aspect of the present invention, a secure communication method of an IPv4/IPv6 integrated network system comprises the steps of: sharing, by at least one node included in a different kind of Internet Protocol (IP) network, a value of a secret key; creating, by each of the nodes, KEY-ID capable of identifying the shared secret key value; and exchanging, by each of the nodes, the KEY-IDs to perform a secure negotiating process.

In this respect, the step of creating the KEY-ID preferably comprises the step of setting to the KEY-ID a lower 32-bit value, which is a result value obtained by processing the secret key value by means of a hash function.

The step of performing the secure negotiating process preferably comprises the steps of: transmitting, by a first node to a second node, a first packet containing an Internet Key Exchange (IKE) payload in which an IKE header (HDR), secure association (SA) information, and the KEY-ID are included; and transmitting, by the second node to the first node, a second packet containing the IKE payload in which the IKE HDR, the SA information, and the KEY-ID are included.

The secure communication method preferably further comprises the step of dynamically assigning an IPv4 address to the first node, and performing mutual translation between the first packet and the second packet.

Furthermore, the IKE payload preferably has a value defined as a value of the KEY-ID among reserved next payload values set for a Next Payload field, and includes an identification payload for which the KEY-ID is set.

Each of the nodes is either an IPv6 node included in an IPv6 network or an IPv4 node included in an IPv4 network.

In addition, the secure communication method preferably further comprises the steps of: creating encryption keys based on a value of the secret key selected in the secure negotiating process and values of key exchange and random numbers (Ni and Nr) shared in an encryption key sharing process; and when an authentication process based on the key exchange of the encryption keys is completed, encrypting data based on the encryption keys to perform secure communication.

According to yet another aspect of the present invention, a secure communication method of an IPv4/IPv6 integrated network system comprises the steps of: sharing, by at least one IPv6 node and an IPv4 node, a value of a secret key; creating, by each of the nodes, identification information capable of identifying each of the secret keys; exchanging, by each of the IPv6 nodes and the IPv4 node, the identification information in a secure negotiating process based on an Internet Key Exchange (IKE); and performing, by each of the IPv6 nodes and the IPv4 node, the secure negotiating process based on the secret keys corresponding to the identification information.

In this regard, the secure communication method preferably further comprises the steps of: creating encryption keys based on a value of the secret key selected in the secure negotiating process and values of key exchange and random numbers (Ni and Nr) shared in an encryption key sharing process; and when an authentication process based on the key exchange of the encryption keys is completed, encrypting data based on the encryption keys so as to perform secure communication.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 illustrates a Pre-Shared Key (PSK) set for an ordinary IPv4 node;

FIG. 3 illustrates a PSK set for an ordinary IPv6 node;

FIG. 4 illustrates PSKs set for each IPv6 node according to an exemplary embodiment of the present invention;

FIG. 5 illustrates PSKs set for each IPv4 node according to an exemplary embodiment of the present invention;

FIG. 6 illustrates creation of a KEY-ID according to an exemplary embodiment of the present invention;

FIG. 9 illustrates the format of a payload type according to the present invention;

FIG. 10 illustrates a KEY-ID payload according to the present invention.

DETAILED DESCRIPTION OF THE INVENTION

Hereinafter, a secure communication system and method for an Internet Protocol version 4/Internet Protocol version 6 (IPv4/IPv6) integrated network system will be described in full detail with reference to the accompanying drawings.

Figure 1:
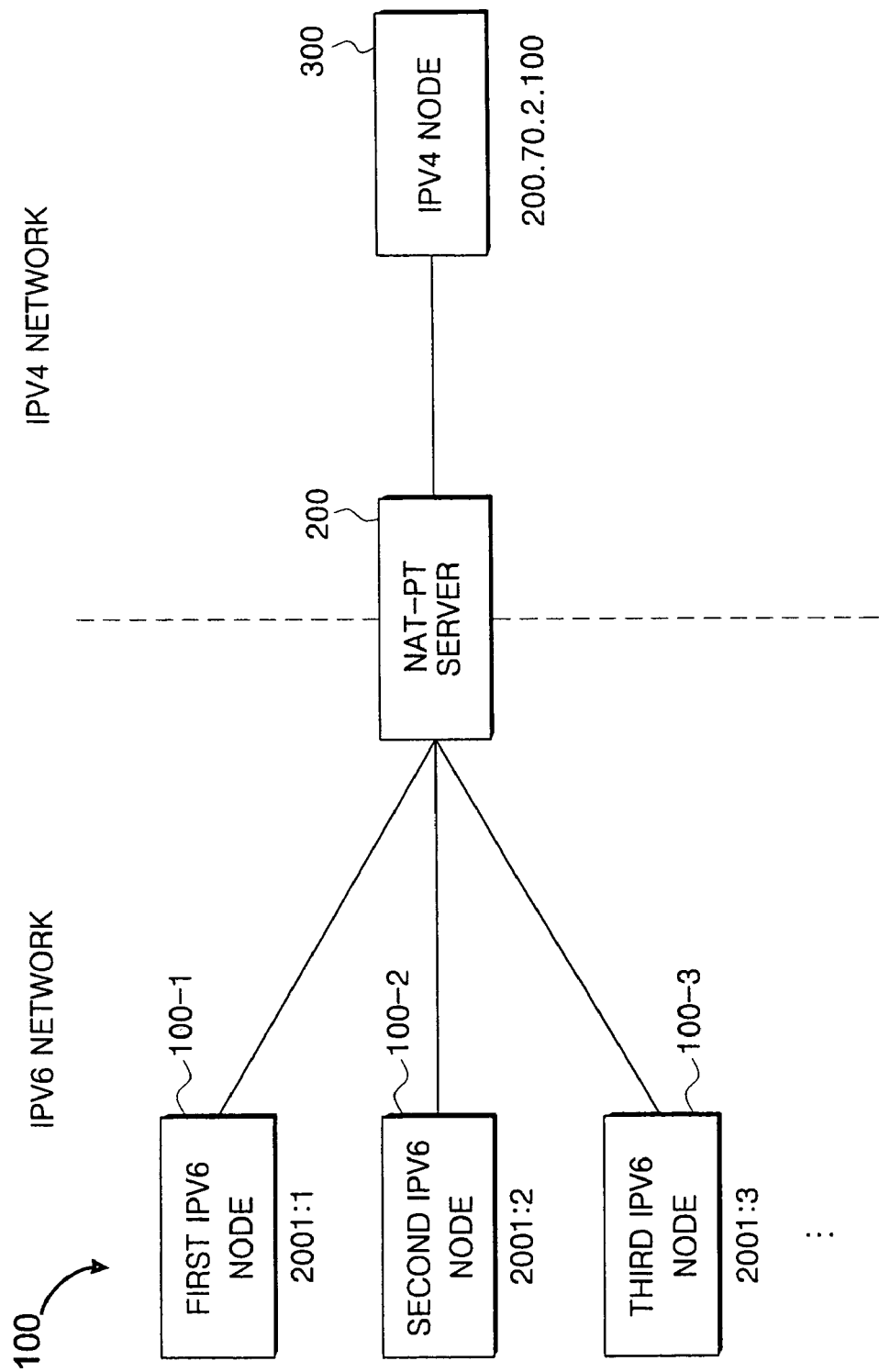
FIG. 1 is a block diagram of an Internet Protocol version 4/Internet Protocol version 6 (IPv4/IPv6) integrated network according to an exemplary embodiment of the present invention.

FIG. 1 is a block diagram of an IPv4/IPv6 integrated network according to an exemplary embodiment of the present invention.

Referring to FIG. 1, a plurality of IPv6 nodes 100 included in an IPv6 network and an IPv4 node 300 included in an IPv4 network are connected through a Network Address Translation-Protocol Translation (NAT-PT) server 200.

The NAT-PT server 200 is located at a boundary between the IPv4 network and the IPv6 network, and dynamically assigns IPv4 addresses to the IPv6 nodes 100 based on an IPv4 address pool (not shown) in which the IPv4 addresses to be dynamically assigned to the IPv6 nodes 100 are collected whenever a session is initiated.

The case of performing secure communication complying with an Internet Key Exchange (IKE) on the basis of a Pre-Shared Key (PSK) mode between each at the IPv6 nodes 100 and the IPv4 node 300 will be described below.

Furthermore, the case in which the IPv4 node 300 shares a secret key with the plurality of IPv6 nodes 100 will be described below by way of example, but this can be equally applied to the case in which any of the IPv6 nodes 100 shares the secret key with a plurality of IPv4 nodes 300.

FIG. 2 illustrates a PSK set for an ordinary IPv4 node.

As illustrated in FIG. 2, each PSK contains an identifier (ID) and a secret key. The ID of each secret key is information on an IP address. "220.70.2.50" is an IPv4 address which the NAT-PT server 200 dynamically assigns to an IPv6 node 100-1, 100-2 or 100-3, and "220.70.2.100" is an IPv4 address of the IPv4 node 300. The secret key matched to each identifier is "1234."

FIG. 3 illustrates a PSK set for an ordinary IPv6 node.

As illustrated in FIG. 3, the ID of each secret key is information on an IP address. "2001::1" is an IPv6 address of the first IPv6 node 100, and "3ffe:2e00:e:fff9::220.70.3.100" is an address created by attaching an IP address, "220.70.2.100," of the IPv4 node 300 to a rear end of a prefix address, "3ffe:2e00:e:fff9," of the NAT-PT server 200. The secret key matched to each identifier is "1234."

As described in FIGS. 2 and 3, it can be found that each node shares the same secret key, and that the ID for identifying each secret key uses the IP address of each node.

However, the IP address cannot be used as the ID for identifying the secret key of the IPv4 node 300 performing secure communication with the IPv6 node 100 in the IPv4/IPv6 integrated network. To be specific, because the IPv4 address (220.70.2.50) arbitrarily assigned to the IPv6 node 100 is dynamically assigned by the NAT-PT server 200, the IPv4 node 300 cannot identify the secret key depending on the IP address of the IPv6 node 100. As a result, the IPv4 node 300 cannot perform secure communication.

Therefore, the IPv4 node 300 and the IPv6 nodes 100 each create an ID (hereinafter, referred to as "KEY-ID") other than the IP address information based on the shared secret key, and perform secure communication complying with the IKE rules on the basis of the secret key.

FIG. 4 illustrates PSKs set for each IPv6 node according to an exemplary embodiment of the present invention.

As illustrated in FIG. 4, each IPv6 node 100-1, 100-2 or 100-3 creates a KEY-ID based on the secret key of a PSK.

For example, the KEY-ID of the first IPv6 node 100-1 is "12345678" and its matched secret key is "1111." The KEY-ID of the second IPv6 node 100-2 is "87654321" and its matched secret key is "2222." The KEY-ID of the third IPv6 node 100-3 is "12341234" and its matched secret key is "3333."

FIG. 5 illustrates PSKs set for each IPv4 node according to an exemplary embodiment of the present invention.

As illustrated in FIG. 5, the IPv4 node 300 creates KEY-IDs capable of identifying each secret key based on each secret key shared with each of the IPv6 nodes 100, and stores and manages the KEY-IDs as well as the secret keys matched to the KEY-IDs.

For example, the IPv4 node 300 has a first KEY-ID, "12345678" matched to a first secret key of "1111," a second KEY-ID, "87654321" matched to a second secret key of "2222," and a third KEY-ID, "12341234" matched to a third secret key of "3333."

In this manner, each of the IPv6 nodes 100 and the IPv4 node 300 can set to the KEY-ID a lower 32-bit value, which is a result value obtained by processing the key value of a secret key by means of a hash function specified in the Secure Hash Standard.

FIG. 6 illustrates creation of a KEY-ID according to an exemplary embodiment of the present invention.

As illustrated in FIG. 6, each of the IPv6 nodes 100 and the IPv4 node 300 can set, to a KEY-ID of the corresponding secret key, a lower 32-bit value, which is a result value obtained by processing the key value of a secret key of each shared PSK by means of a hash function.

Each of the IPv6 nodes 100 and the IPv4 node 300 exchange KEY-IDs without transmitting an existing IP address, thereby performing secure communication using an ID of the secret key according to the IKE rules.

In FIGS. 4 and 5, the KEY-IDs are represented in terms of a decimal system by way of example, but they may be represented in terms of any other numeral system, such as the binary system, the hexadecimal system, and so forth.

Figure 7:
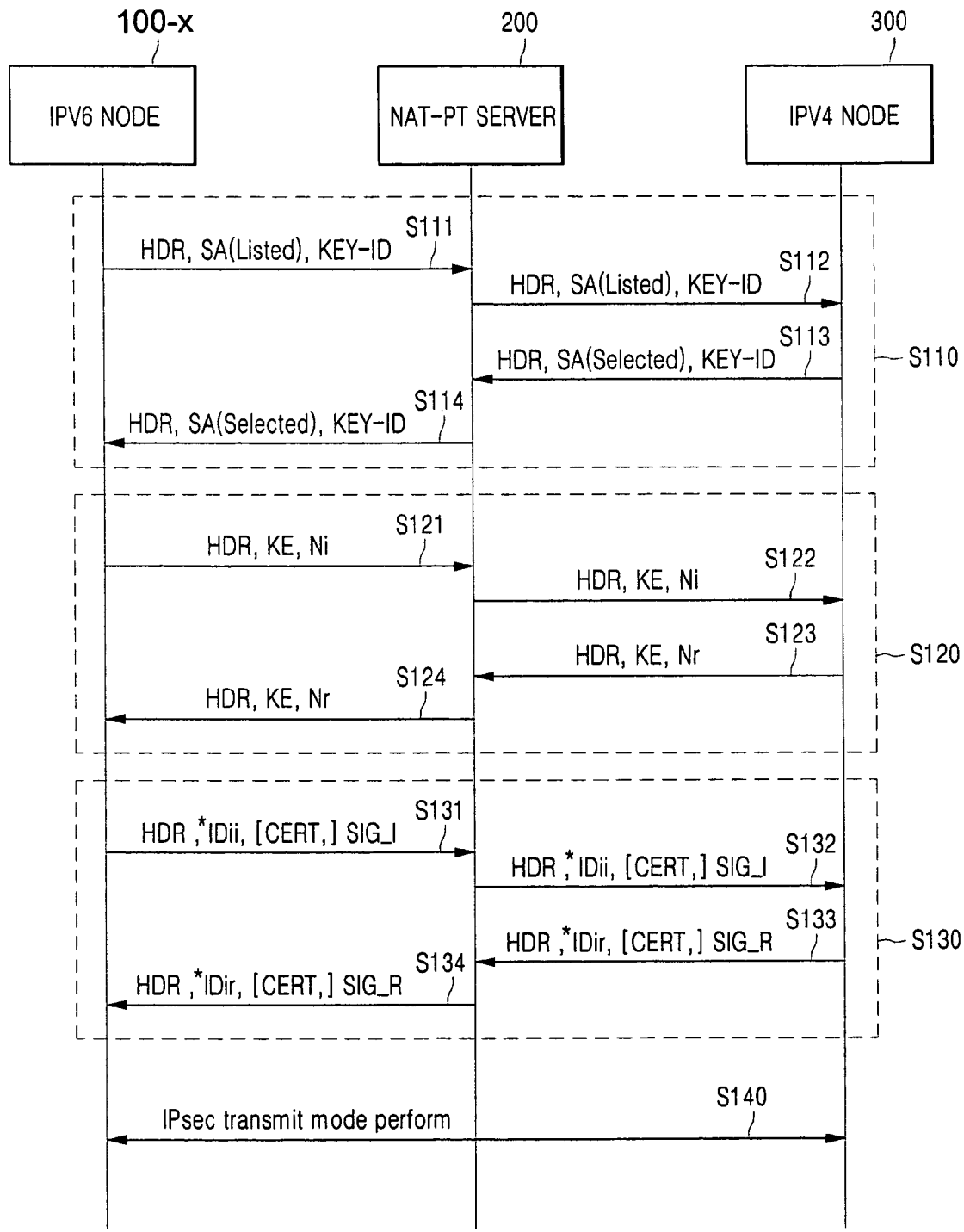
FIG. 7 is a signal flow diagram illustrating a secure communication method of an IPv4/IPv6 integrated network system according to an exemplary embodiment of the present invention.

FIG. 7 is a signal flow diagram illustrating a secure communication method of an IPv4/IPv6 integrated network system according to an exemplary embodiment of the present invention.

Referring to FIG. 7, each IPv6 node 100-*x* and the IPv4 node 300 create a KEY-ID capable of identifying a secret key of a shared PSK, as described in FIGS. 4 and 5.

Each IPv6 node 100-*x* and the IPv4 node 300 start secure communication based on IPSec. A process of secure communication generally includes a secure negotiating process S110, an encryption key sharing process S120, an authentication process S130, and a secure communication performing process S140.

The data flow of the secure negotiating process S110 is as follows.

Each IPv6 node 100-*x* constructs an IKE payload including an IKE header (hereinafter, abbreviated to "HDR"), SA information (e.g. cryptographic algorithm), and a KEY-ID for the purpose of IKE negotiation, creates an IPv6 packet containing the IKE payload, and transmits the IPv6 packet to the NAT-PT server 200 (S111).

Figure 8:
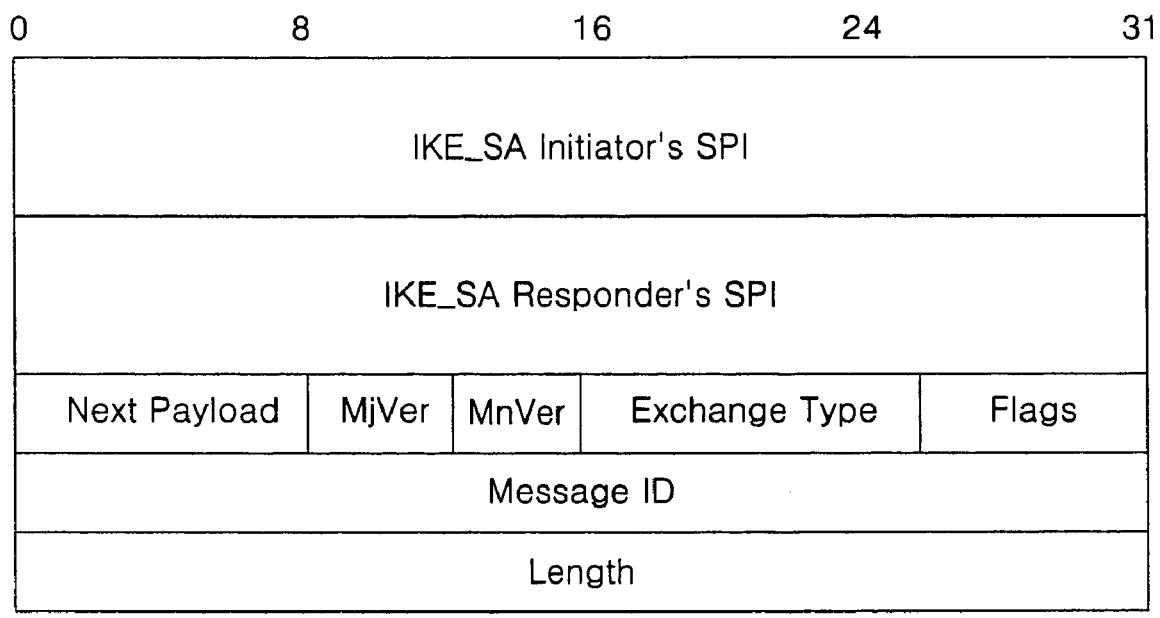
FIG. 8 illustrates the format of a header (HDR) according to the present invention.

FIG. 8 illustrates the format of an HDR according to the present invention. As illustrated in FIG. 8, an HDR includes an "IKE_SA Initiator's SPI" field having a value selected by an initiator in order to identify SA information, an "IKE_SA Responder's SPI" field having a value selected by a responder in order to identify SA information, a "Next Payload" field indicating a payload type to be located next to the HDR, "MjVer" and "MnVer" fields indicating a version of the protocol used, an "Exchange Type" field indicating a message exchange type, a "Flags" field indicating an option selected for a message, a "Message ID" field for controlling re-transmission of data and matching a request and a response, and a "Length" field indicating a total length of the payload message following the HDR.

FIG. 9 illustrates the format of a payload type according to the present invention.

As illustrated in FIG. 9, any one of the payload type values that are not defined, i.e. are reserved for private use, in a payload type may be defined as one for a KEY-ID.

FIG. 10 illustrates a KEY-ID payload according to the present invention.

As illustrated in FIG. 10, either each IPv6 node 100-*x* or the IPv4 node 300 sets a payload type value of a KEY-ID defined in a "Next Payload" field, includes the KEY-ID, which is capable of identifying a secret key, in the "Next Payload" field, and then connects the "Next Payload" field to a rear end of an HDR, thereby creating an IKE payload, as illustrated in FIG. 8.

The NAT-PT server 200 translates an IPv6 packet into an IPv4 packet depending on an IPv4 address assigned to each IPv6 node 100-*x* on the basis of an IPv4 address pool. At this time, the NAT-PT server 200 manages the IPv4 addresses assigned to the IPv6 nodes 100 using a mapping table.

The NAT-PT server 200 transmits the translated IPv4 packet to the IPv4 node 300 (S112 of FIG. 7).

To be specific, the HDR, the SA information, and the KEY-ID are transmitted from the IPv6 node 100-*x* to the IPv4 node 300. In this regard, in the case of the SA information, numerous pieces of SA information can be transmitted in a listed type.

When the IPv4 packet, in which an IKE payload having the HDR, the SA information, and the KEY-ID is included, is received from the NAT-PT server 200, the IPv4 node 300 selects a secret key according to the KEY-ID included in the IKE payload.

The IPv4 node 300 creates the IPv4 packet, in which the IKE payload having the HDR, the SA information, and the KEY-ID capable of identifying the secret key of the selected PSK is included, for the purpose of IKE negotiation with the IPv6 node 100-*x*, and then transmits the created IPv4 packet to the NAT-PT server 200 (S113).

The NAT-PT server 200 translates the IPv4 packet into an IPv6 packet on the basis of the mapping table, and transmits the translated IPv6 packet to the IPv6 node 100 (S114).

To be specific, the HDR, the SA information and the KEY-ID are transmitted from the IPv4 node 300 to the IPv6 node 100-*x*. At this time, in the case of the SA information, the SA information selected by the IPv4 node 300 from numerous pieces of SA information transmitted from the IPv6 node 100-*x* is transmitted.

Accordingly, in the secure negotiating process S110, the IPv6 node 100-*x* and the IPv4 node 300 can confirm the secret key of the shared PSK by means of the KEY-ID, thus processing the secure negotiation based on the SA information and the secret key.

Next, the procedure of transmitting data in the encryption key sharing process S120 is as follows.

The IPv6 node 100-*x* creates an IPv6 packet containing an IKE payload in which values of an HDR, a key exchange (KE), and a provisional random number, Ni, are included, and transmits the IPv6 packet to the NAT-PT server 200 (S121).

The NAT-PT server 200 translates the IPv6 packet into an IPv4 packet on the basis of the IPv4 address of the IPv6 node 100-*x* registered with the mapping table, and transmits the translated IPv4 packet to the IPv4 node 300 (S122).

Meanwhile, when the IKE payload, in which the HDR, KE and Ni values are included, is received from the NAT-PT server 200, the IPv4 node 300 detects the KE and Ni values of the IPv6 node 100-*x*.

The IPv4 node 300 creates an IPv4 packet containing the IKE payload in which values of an HDR, an KE and a random number, Nr, are included, and transmits the IPv4 packet to the NAT-PT server 200 (S123).

The NAT-PT server 200 translates the IPv4 packet into an IPv6 packet on the basis of the mapping table, and transmits the IPv6 packet to the IPv6 node 100-*x*(S124).

In other words, each IPv6 node 100-*x* and the IPv4 node 300 create an encryption key to encrypt data using the secret key, the selected SA information, the KE value and the random number values, Ni and Nr, all of which are shared through the encryption key sharing process S120.

The procedure of transmitting data in the authentication process S130 is as follows.

The IPv6 node 100-*x* creates address information, IDii, and authentication information, [CRET,]SIG_I, as well as an IPv6 packet containing the IKE payload encrypting the IDii, the [CRET,]SIG_I, and an HDR, and transmits the IPv6 packet to the NAT-PT server 200 (S131).

The NAT-PT server 200 translates the IPv6 packet into an IPv4 packet on the basis of the mapping table, and transmits the IPv4 packet to the IPv4 node 300 (S132).

Meanwhile, the IPv4 node 300 authenticates the IPv6 node 100 based on the IDii, the [CRET,]SIG_I, etc. which are included in the IKE payload of the received IPv4 packet.

When the IPv6 node 100-*x* is authenticated, the IPv4 node 300 creates its address information, IDir, and authentication information, [CRET,]SIG_R, in which the IDir is reflected, as well as an IPv4 packet containing the IKE payload encrypting the IDir, the [CRET,]SIG_R, and an HDR using key information KE, and transmits the IPv4 packet to the NAT-PT server 200 (S133).

The NAT-PT server 200 translates the IPv4 packet into an IPv6 packet on the basis of the mapping table, and transmits the IPv6 packet to the IPv6 node 100-*x*(S134).

The IPv6 node 100-*x* authenticates the IPv4 node 300 based on the IDir and the [CRET,]SIG_R which are included in the IPv6 packet.

When the mutual authentication is completed between the IPv6 node 100-*x* and the IPv4 node 300, secure communication based on IPSec is performed between the IPv6 node 100-*x* and the IPv4 node 300 using the encryption key shared through the encryption key sharing process S120 (S140).

Figure 11:
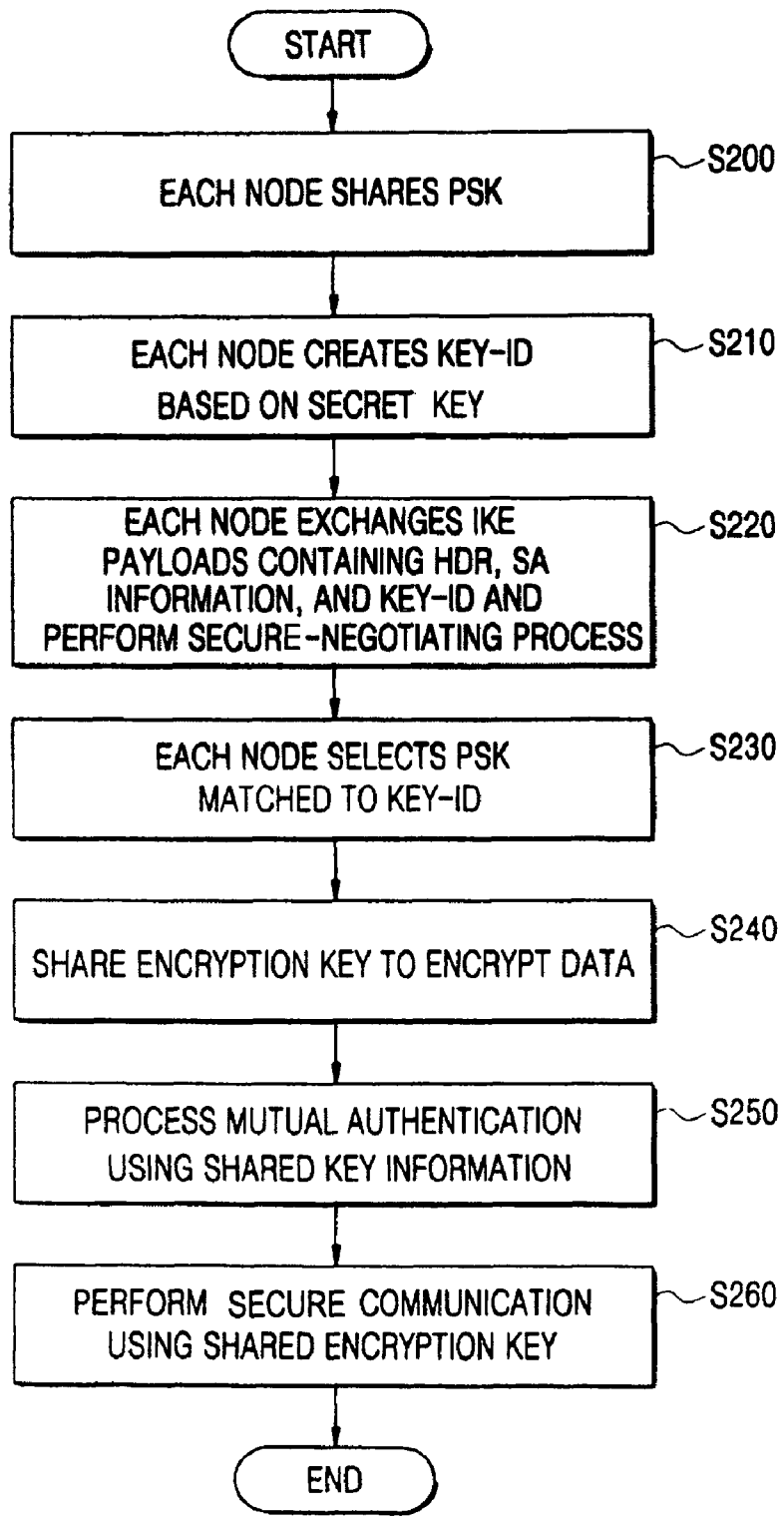
FIG. 11 is a flowchart of a secure communication method of an IPv4/IPv6 integrated network system according to an exemplary embodiment of the present invention

FIG. 11 is a flowchart of a secure communication method of an IPv4/IPv6 integrated network system according to an exemplary embodiment of the present invention.

Referring to FIG. 1, the IPv4 node 300 included in the IPv4 network, and the plurality of IPv6 nodes 100 included in the IPv6 network, share a secret key (S200).

Each IPv6 node 100-*x* and the IPv4 node 300 create KEY-IDs capable of identifying each secret key based on the shared secret key (S210).

Each IPv6 node 100-*x* and the IPv4 node 300 can set, to the KEY-ID of the corresponding secret key, a lower 32-bit value, which is a result value obtained by processing the key value of a secret key of each shared PSK by means of a hash function specified in the Secure Hash Standard.

Each IPv6 node 100-*x* and the IPv4 node 300 exchange IKE payloads, each of which includes an HDR, SA information and KEY-IDs, thereby performing secure communication (S220).

Each IPv6 node 100-*x* and the IPv4 node 300 select the secret keys matched to the exchanged KEY-IDs (S230).

Each IPv6 node 100-*x* and the IPv4 node 300 exchange the IKE payloads, each of which includes values of an HDR, a KE and a provisional random number, Ni, and share an encryption key to encrypt data using the secret key, the SA information, the KE, and the random numbers, Ni and Nr, all of which are shared (S240).

Each IPv6 node 100-*x* creates address information, IDii, and authentication information, [CRET,]SIG_I, as well as an IPv6 packet containing the IKE payload encrypting the IDii, the [CRET,]SIG_I, and an HDR, and transmits the IPv6 packet to the IPv4 node 300 through the NAT-PT server 200.

The IPv4 node 300 authenticates each of the IPv6 nodes 100 based on the IDii, the [CRET,]SIG_I, etc. which are included in the received IKE payload, and transmits an IPv4 packet containing the IKE payload, which encrypts address information thereof, IDir, and authentication information, [CRET,]SIG_R, in which the IDir is reflected, and an HDR using key information KE, to each IPv6 node 100-*x* through the NAT-PT server 200.

Each IPv6 node 100-*x* authenticates the IPv4 node 300 using the IDir and the [CRET,]SIG_R included in the IPv6 packet (S250).

When the mutual authentication is completed between each IPv6 node 100-*x* and the IPv4 node 300, secure communication based on IPSec is performed between each IPv6 node 100-*x* and the IPv4 node 300 using the encryption key shared through the encryption key sharing process S120 (S260).

At this point, the NAT-PT server 200 manages a mapping table based on the IPv4 addresses assigned to the IPv6 nodes 100 based on an IPv4 address pool, translates the IPv6 packet into the IPv4 packet, and vice versa.

As described above, according to the present invention, the ID information capable of identifying the secret key is used as the IP address information in the integrated network of the IPv4 network and the IPv6 network, and the IPv4 node and the IPv6 nodes can identify the secret key, even when the packets are translated through the NAT-PT server. As a result, the secure communication based on the IPSec can be implemented in the IPv4/IPv6 integrated network based on the secret key mode.

While the present invention has been described with reference to the exemplary embodiments, it should be understood by those skilled in the art that various other modifications and changes may be provided within the spirit and scope the present invention as defined in the following claims.

What is claimed is:

1. An Internet Protocol version 4/Internet Protocol version 6 (IPv4/IPv6) integrated network system, comprising:
   at least one first node to create at least one first KEY-ID identifying at least one secret key shared between the at least one first node and at least one second node, and to exchange the at least one first KEY-ID with the at least one second node in a secure negotiating process; and
   the at least one second node to create at least one second KEY-ID identifying the at least one shared secret key, to exchange the at least one second KEY-ID with the at least one first node, and to perform the secure negotiating process based on the shared secret keys corresponding to the exchanged KEY-IDs,
   wherein each of the exchanged KEY-IDs comprises a lower 32-bit value corresponding to a key value of the respective shared secret key processed by means of a hash function, and
   wherein each of the at least one first node or the at least one second node sets a payload value indicating the respective KEY-ID among reserved next payload values for a Next Payload field, and transmits the respective KEY-ID by means of an Internet Key Exchange (IKE) payload in which the respective KEY-ID is set for the Next Payload field.

2. The IPv4/IPv6 integrated network system according to claim 1, wherein each of the at least one first node constructs an Internet Key Exchange (IKE) payload comprising an IKE header (HDR), secure association (SA) information, and the respective KEY-ID.

3. The IPv4/IPv6 integrated network system according to claim 1, wherein each of the at least one first node is an IPv6 node in an IPv6 network and each of the at least one second node is an IPv4 node in an IPv4 network.

4. The IPv4/IPv6 integrated network system according to claim 1, further comprising a Network Address Translation-Protocol Translation (NAT-PT) server having an address pool for assigning an IPv4 address to each of the at least one first node in an IPv6 network, to manage an address table comprising IPv4 addresses assigned to the at least one first node in the IPv6 network, and to perform mutual translation between an IPv6 packet and an IPv4 packet based on the address table.

5. The IPv4/IPv6 integrated network system according to claim 1, wherein each of the at least one first node creates an encryption key based on a value of a secret key selected in the secure negotiating process and values of key exchange and random numbers shared in an encryption key sharing process, and in response to an authentication process based on the key exchange being completed, the at least one first node and the at least one second node encrypt data based on the encryption key to perform secure communication.

6. An Internet Protocol version 4/Internet Protocol version 6 (IPv4/IPv6) integrated network system, comprising:
   at least one IPv4 node to create first identification information identifying at least one secret key shared between the at least one IPv4 node and at least one IPv6 node, and to exchange the first identification information with the at least one IPv6 node in a secure negotiating process based on an Internet Key Exchange (IKE); and
   the at least one IPv6 node to create second identification information identifying the at least one shared secret key, to exchange the second identification information with the at least one IPv4 node, and to perform the secure negotiating process using the at least one shared secret key corresponding to the first identification information and the second identification information exchanged in the secure negotiating process,
   wherein each of the first identification information and the second identification information comprises a lower 32-bit value corresponding to a key value of the respective shared secret key processed by means of a hash function, and wherein each of the at least one IPv4 node or the at least one IPv6 node sets a payload value indicating the respective identification information among reserved next payload values for a Next Payload field, and transmits the respective identification information by means of an Internet Key Exchange (IKE) payload in which the respective identification information is set for the Next Payload field.

7. A secure communication method of an Internet Protocol version 4/Internet Protocol version 6 (IPv4/IPv6)integrated network system, the secure communication method comprising:
sharing, by a first node in a first Internet Protocol (IP) network and a second node in a second IP network different from the first IP network, a value of a secret key;
creating, by the first node and the second node, KEY-IDs identifying the shared secret key value; and
exchanging, by the first node and the second node, the KEY-IDs to perform a secure negotiating process,
wherein creating comprises setting, to each of the KEY IDs, a lower 32-bit value which is a result value corresponding to a respective shared secret key value processed by means of a hash function, and
wherein the first node or the second node sets a payload value indicating the respective KEY-ID among reserved next payload values for a Next Payload field, and transmits the respective KEY-ID by means of an Internet Key Exchange (IKE) payload in which the respective KEY-ID is set for the Next Payload field.

8. The secure communication method according to claim 7, wherein performing the secure negotiating process comprises:
transmitting, by the first node to the second node, a first packet comprising an Internet Key Exchange (IKE) payload comprising an IKE header (HDR), secure association (SA) information, and a first KEY-ID of the KEY IDs; and
transmitting, by the second node to the first node, a second packet comprising the IKE payload comprising the IKE HDR, the SA information, and a second KEY-ID of the KEY IDs.

9. The secure communication method according to claim 8, further comprising dynamically assigning an IPv4 address to the first node, and performing mutual translation between the first packet and the second packet.

10. The secure communication method according to claim 8, wherein the IKE payload has a value defined as a value of one of the KEY IDs among reserved next payload values set for a Next Payload field, and comprises an identification payload for which the one of the KEY IDs is set.

11. The secure communication method according to claim 7, wherein the first node is an IPv6 node in an IPv6 network and the second node is an IPv4 node in an IPv4 network.

12. The secure communication method according to claim 7, further comprising:
creating encryption keys based on the value of the secret key shared in the secure negotiating process and values of key exchange and random numbers shared in an encryption key sharing process; and
in response to an authentication process based on key exchange of the encryption keys being completed, encrypting data based on the encryption keys to perform secure communication.

13. A secure communication method of an Internet Protocol version 4/Internet Protocol version 6 (IPv4/IPv6) integrated network system, the secure communication method comprising:
sharing, by an IPv6 node and an IPv4 node, a value of a secret key;
creating, by the IPv6 node and the IPv4 node, identification information identifying the secret key value;
exchanging, by the IPv6 node and the IPv4 node, the identification information in a secure negotiating process based on an Internet Key Exchange (IKE); and
performing, by the IPv6 node and the IPv4 node, the secure negotiating process based on the secret key corresponding to the identification information,
wherein creating comprises setting, to the identification information, a lower 32-bit value which is a result value corresponding to a respective shared secret key value processed by means of a hash function, and
wherein the IPv4 node or the IPv6 node sets a payload value indicating the respective identification information among reserved next payload values for a Next Payload field, and transmits the respective identification information by means of an Internet Key Exchange (IKE) payload in which the respective identification information is set for the Next Payload field.

14. The secure communication method according to claim 13, further comprising:
creating encryption keys based on the value of the secret key shared in the secure negotiating process and values of key exchange and random numbers shared in an encryption key sharing process; and
in response to an authentication process based on key exchange of the encryption keys being completed, encrypting data based on the encryption keys to perform secure communication.

* * * * *

UNITED STATES PATENT AND TRADEMARK OFFICE
CERTIFICATE OF CORRECTION

PATENT NO. : 8,266,428 B2  
APPLICATION NO. : 11/640924  
DATED : September 11, 2012  
INVENTOR(S) : Kwon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1027 days.

Signed and Sealed this  
Twenty-ninth Day of December, 2015

Michelle K. Lee  
*Director of the United States Patent and Trademark Office*